United States Patent [19]
Ming et al.

[11] Patent Number: 5,558,058
[45] Date of Patent: Sep. 24, 1996

[54] FOUR STROKE ENGINE WITH COMBINED OIL PUMP AND FILTER ASSEMBLY

[75] Inventors: Lam H. Ming, Tsing Yi Island; Chu K. Ying, Yuen Long, both of Hong Kong

[73] Assignee: Outboard Marine Corporation, Waukegan, Ill.

[21] Appl. No.: 253,362

[22] Filed: Jun. 3, 1994

[51] Int. Cl.⁶ .................................................. F01M 11/03
[52] U.S. Cl. ...................... 123/196 A; 184/31; 210/416.5
[58] Field of Search .......................... 123/196 A; 184/31; 210/130, 168, 416.5

[56] References Cited

U.S. PATENT DOCUMENTS

| | | | |
|---|---|---|---|
| 3,572,509 | 3/1971 | Dexter | 210/130 |
| 3,598,237 | 8/1971 | Aspinwall | 210/130 |
| 4,622,136 | 10/1986 | Karcey | 210/168 |
| 5,207,898 | 5/1993 | Hodgkins | 123/196 A |
| 5,236,064 | 8/1993 | Wagoner | 123/196 A |
| 5,452,695 | 9/1995 | Bedi | 123/196 A |

FOREIGN PATENT DOCUMENTS

| | | |
|---|---|---|
| 2404456 | 9/1978 | France . |
| 2093363A | 2/1981 | United Kingdom . |
| 2168262A | 6/1986 | United Kingdom . |

*Primary Examiner*—Erick R. Solis
*Attorney, Agent, or Firm*—Michael, Best & Friedrich

[57] ABSTRACT

Disclosed herein is an oil pump assembly comprising a housing member including a first mounting surface, a cover member mounting surface spaced from the first mounting surface, a bore extending from the cover member mounting surface and including, adjacent the cover member mounting surface, a counter bore, an oil supply passage extending between the first mounting surface and the cover member mounting surface for communication with an oil supply source, and an oil delivery passage extending between the first mounting surface and the cover member mounting surface for communication with an oil delivery conduit, a cover member including a housing member mounting surface fixed to the cover member mounting surface of the housing member, an other mounting surface, an oil supply recess located in the housing member mounting surface and communicating with the counter bore in the housing member, an internal oil supply conduit communicating between the oil supply recess and the housing member mounting surface and communicating with the oil supply passage in the housing member, an oil discharge recess located in the housing member mounting surface and communicating with the counter bore in the housing member, an internal oil discharge passage communicating between the oil discharge recess and the other mounting surface, and an internal oil delivery passage extending between the housing member mounting surface and the other mounting surface and communicating with the oil delivery passage in the housing member.

19 Claims, 4 Drawing Sheets

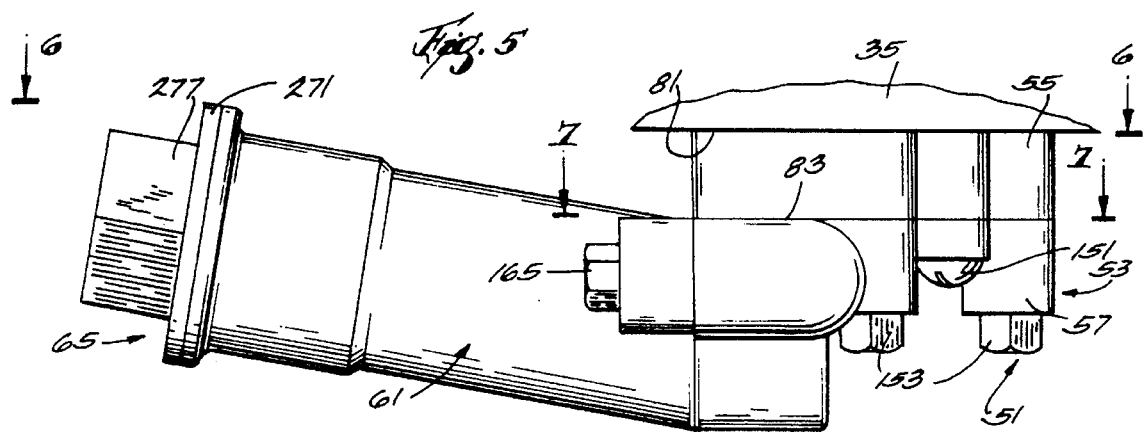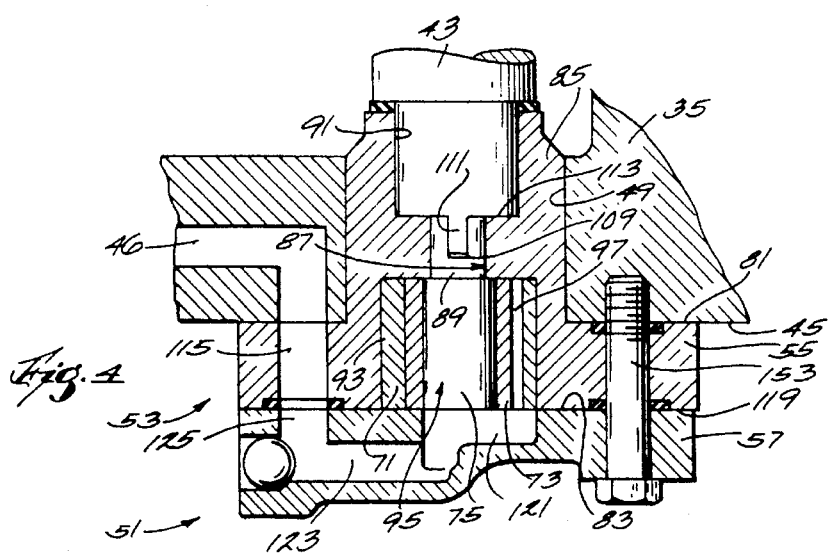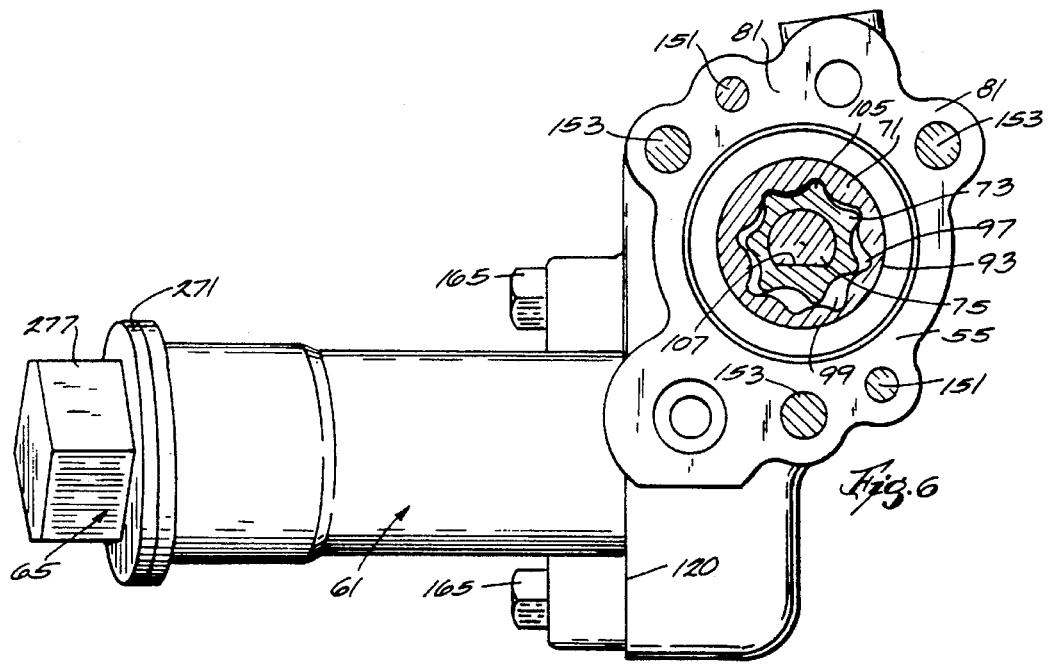

FOUR STROKE ENGINE WITH COMBINED OIL PUMP AND FILTER ASSEMBLY

BACKGROUND OF THE INVENTION

The invention relates generally to four cylinder internal combustion engines and to lubrication oil pumps therefore. The invention also relates to lubricating oil pumps and associated filters.

SUMMARY OF THE INVENTION

The invention provides an oil pump assembly comprising a housing member including a first mounting surface adapted to engage a first other mounting surface, a cover member mounting surface spaced from the first mounting surface, a bore extending from the cover member mounting surface and including, adjacent the cover member mounting surface, a counter bore defining a pumping chamber, an oil supply passage extending between the first mounting surface and the cover member mounting surface for communication with an oil supply port in the first other mounting surface, and an oil delivery passage extending between the first mounting surface and the cover member mounting surface for communication with an oil delivery port in the first other mounting surface, a cover member including a housing member mounting surface engaging the cover member mounting surface of the housing member, a second other mounting surface, an oil supply recess located in the housing member mounting surface and communicating with the counter bore in the housing member, an internal oil supply conduit communicating between the oil supply recess and the housing member mounting surface and communicating with the oil supply passage in the housing member, an oil discharge recess located in the housing member mounting surface and communicating with the counter bore in the housing member, an internal oil discharge passage communicating between the oil discharge recess and the second other mounting surface, and an internal oil delivery passage extending between the housing member mounting surface and the second other mounting surface and communicating with the oil delivery passage in the housing member, and fasteners releasably connecting the cover member to the housing member to form a pump assembly.

The invention also provides an oil pump and filter assembly comprising a housing member including a first mounting surface adapted to engage a first other mounting surface, a cover member mounting surface spaced from the first mounting surface, a bore extending from the cover member mounting surface and including, adjacent the cover member mounting surface, a counter bore, an oil supply passage extending between the first mounting surface and being adapted to communicate with an oil supply port in the first other mounting surface, and an oil delivery passage extending between the first mounting surface and the cover member mounting surface and adapted to communicate with an oil delivery port in the first other mounting surface, a rotor located in the counter bore and having a central aperture with an inner periphery including an endless series of teeth, a driver located in the central aperture of the rotor and including an outer periphery with an endless series of teeth which intermesh with the teeth of the inner periphery of the rotor and which are one less in number than the teeth of the rotor, and a driveshaft extending in the bore, adapted to be rotated by a camshaft, and drivingly connected to the driver for rotation thereof in common with rotation of the driveshaft, a cover member including a housing member mounting surface engaging the cover member mounting surface of the housing member, a filter assembly mounting surface, an oil supply recess located in the housing member mounting surface and communicating with the counter bore in the housing member, an internal oil supply conduit communicating between the oil supply recess and the housing member mounting surface and communicating with the oil supply passage in the housing member, an oil discharge recess located in the housing member mounting surface and communicating with the counter bore in the housing member, an internal oil discharge passage communicating between the oil discharge recess and the filter assembly mounting surface, and an internal oil delivery passage extending between the housing member mounting surface and the filter assembly mounting surface and communicating with the oil delivery passage in the housing member, fasteners releasably connecting the cover member to the housing member to form a pump assembly, a filter assembly including a filter housing having a cover member mounting surface engaging the filter assembly mounting surface, a central bore extending from the cover member mounting surface and communicating with the oil delivery passage in the cover member, and an internal oil supply passage communicating with the central bore in spaced relation from the cover member mounting surface and with the discharge passage in the cover member, and a filter module located in the bore in the filter housing and including a filter element intermediate the cover member mounting surface and the filter housing oil supply passage, and fasteners releasably connecting the filter housing to the cover member.

The invention also provides an internal combustion engine comprising a cylinder head having a mounting surface including therein a camshaft opening, an oil delivery port, and an oil supply port, and an oil pump assembly comprising a housing member including a cylinder head mounting surface engaging the mounting surface on the cylinder head, a cover member mounting surface spaced from the cylinder head mounting surface, a bore extending from the cover member mounting surface in alignment with the camshaft opening and including, adjacent the cover member mounting surface, a counter bore, an oil supply passage extending between the cylinder head mounting surface and the cover member mounting surface and communicating with the oil supply port in the mounting surface of the cylinder head, and an oil delivery passage extending between the cylinder head mounting surface and the cover member mounting surface and communicating with the oil delivery port in the mounting surface of the cylinder head, and a cover member including a housing member mounting surface engaging the cover member mounting surface of the housing member, an other mounting surface, an oil supply recess located in the housing member mounting surface and communicating with the counter bore in the housing member, an internal oil supply conduit communicating between the oil supply recess and the housing member mounting surface and communicating with the oil supply passage in the housing member, an oil discharge recess located in the housing member mounting surface and communicating with the counter bore in the housing member, an internal oil discharge passage communicating between the oil discharge recess and the other mounting surface, and an internal oil delivery passage extending between the housing member mounting surface and the other mounting surface and communicating with the oil delivery passage in the housing member, fasteners releasably connecting the cover member to the housing member to form a pump assembly, and fasteners releasably connecting the pump assembly to the cylinder head.

The invention also provides an internal combustion engine comprising a cylinder head having a mounting surface including therein a camshaft opening, an oil delivery port, and an oil supply port, and an oil pump and filter assembly comprising a housing member including a cylinder head mounting surface engaged with the mounting surface on the cylinder head, a cover member mounting surface spaced from the cylinder head mounting surface, a bore extending from the cover member mounting surface in alignment with the camshaft opening and including, adjacent the cover member mounting surface, a counter bore, an oil supply passage extending between the cylinder head mounting surface and the cover member mounting surface and communicating with the oil supply port in the mounting surface of the cylinder head, and an oil delivery passage extending between the cylinder head mounting surface and the cover member mounting surface and communicating with the oil delivery port in the mounting surface of the cylinder head, a rotor located in the counter bore and having a central aperture with an inner periphery including an endless series of teeth, a driver located in the central aperture of the rotor and including an outer periphery with an endless series of teeth which intermesh with the teeth of the inner periphery of the rotor and which are one less in number than the teeth of the rotor, a driveshaft extending in the bore, adapted to be rotated by a camshaft in the cylinder head, and drivingly connected to the driver for rotation thereof in common with rotation of the driveshaft, a cover member including a housing member mounting surface engaging the cover member mounting surface of the housing member, a filter assembly mounting surface, an oil supply recess located in the housing member mounting surface and communicating with the counter bore in the housing member, an internal oil supply conduit communicating between the oil supply recess and the housing member mounting surface and communicating with the oil supply passage in the housing member, an oil discharge recess located in the housing member mounting surface and communicating with the counter bore in the housing member, an internal oil discharge passage communicating between the oil discharge recess and the filter assembly mounting surface, and an internal oil delivery passage extending between the housing member mounting surface and the filter assembly mounting surface and communicating with the oil delivery passage in the housing member, fasteners releasably connecting the cover member to the housing member to form a pump assembly, and fasteners releasably connecting the pump assembly to the cylinder head, a filter assembly including a filter housing having a cover member mounting surface engaging the filter assembly mounting surface, a central bore extending from the cover member mounting surface and communicating with the oil delivery passage in the cover member, and an internal oil supply passage communicating with the central bore in spaced relation from the cover member mounting surface and with the discharge passage in the cover member, and a filter module including a filter element located in the bore in the filter housing intermediate the cover member mounting surface and the oil supply passage in the filter housing, and fasteners releasably connecting the filter housing to the cover member.

The invention also provides a filter assembly including a filter housing having a flat mounting surface adapted to engage another member, a central bore extending from the flat mounting surface and adapted to communicate with an oil delivery conduit, and a delivery passage communicating with the bore in spaced relation to the flat mounting surface and with a source of oil, and a filter module releaseably assembled in the bore in the filter housing and including a filter element intermediate the flat mounting surface and the delivery passage.

The invention also provides an oil filter assembly comprising a filter housing having a mounting surface, a central bore including an end portion extending from the mounting surface, an inner counter bore extending from the end portion, and an outer counter bore extending from the inner counter bore and including an outer threaded portion, and an internal oil supply passage communicating with the mounting surface in spaced relation to the end portion of the central bore and with the outer counter bore in spaced relation from the inner counter bore, and a filter module located in the central bore and including an inner screen retainer located in the inner counter bore and the inner end of the outer counter bore and including a central bore including an inner portion communicating with the end portion of the central bore in the filter housing, and an outer counter bore extending from the inner portion, and an annular filter screen retaining groove, a body member including an inner end portion fixed in the counter bore in the inner screen retainer, a central portion with a plurality of apertures communicating with the outer counter bore in the filter housing, an outer end portion, and an axial bore communicating with the inner portion of the central bore in the inner screen retainer and with the apertures in the central portion, an outer screen retainer including an outer end wall having therein a central aperture communicating with the axial bore in the body member, an outer cylindrical portion extending inwardly from the end wall and fixed on the outer end portion of the body member, and an inner cylindrical portion extending inwardly from the outer cylindrical portion and defining, with the inner screen retainer, an outer screen retaining groove located in facing relation to the inner screen retaining groove, a screen having ends retained in the inner and outer screen retaining grooves, and a closure member including an inner cylindrical portion including a bore communicating with the central aperture in the end wall of the outer screen retainer and including a counter bore fixed on the outer cylindrical portion of the outer screen retainer, and an outer cylindrical surface with a threaded portion threadedly engaged with the outer threaded portion of the outer counter bore of the filter housing.

Other features and advantages of the invention will become apparent to those skilled in the art upon review of the following detailed description, claims and drawings.

THE DRAWINGS

FIG. 4 is a sectional view taken along line 4—4 of FIG. 3.

FIG. 5 is a rear elevational view of the combined oil pump and fuel filter assembly shown in FIG. 2.

FIG. 6 is a sectional view taken along line 6—6 of FIG. 5.

FIG. 10 is a sectional view of the filter assembly incorporated in the combined oil pump and filter assembly shown in FIG. 2.

FIG. 11 is a sectional view taken along line 11—11 of FIG. 10.

FIG. 12 is a sectional view taken along line 12—12 of FIG. 10.

Figure 1:
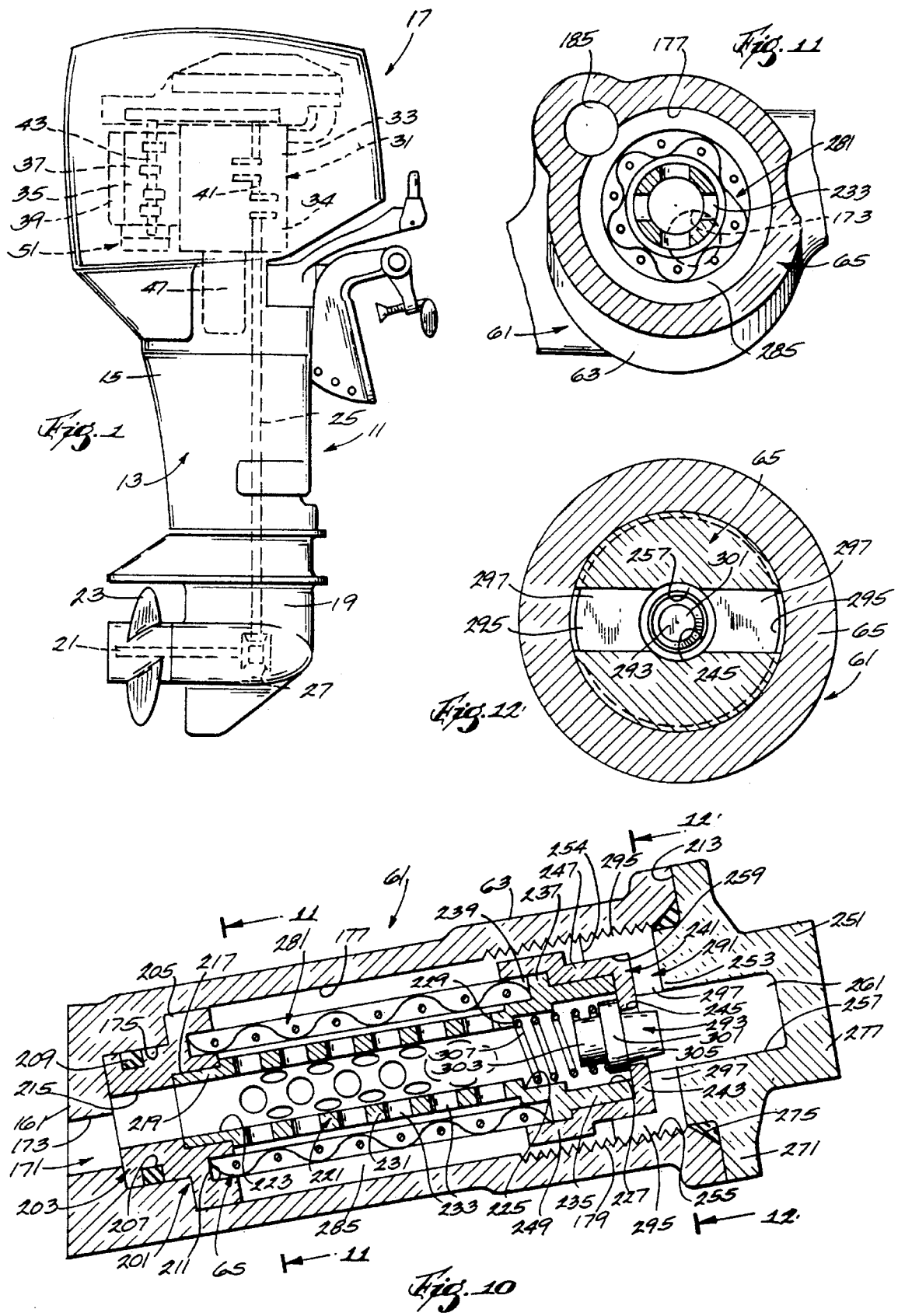
FIG. 1 is a side elevational view of an outboard motor incorporating various of the features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Shown in FIG. 1 of the drawings is an outboard motor 11 including a lower unit 13 comprising a driveshaft housing 15 having an upper end to which a powerhead assembly 17 is rigidly connected. The driveshaft housing 15 also includes a lower end to which is rigidly connected is a gearcase assembly 19 rotatably supporting a propeller shaft 21 carrying a propeller 23.

The lower unit 13 also includes a driveshaft 25 which is rotatably supported in the driveshaft housing 15 and which, at its lower end, is drivingly connected through a transmission 27 with the propeller shaft 21.

The powerhead assembly 17 includes an internal combustion engine comprising an engine block assembly 31 including a cylinder block 33 which defines a crankcase 34 and one or more cylinders (not shown) and to which is attached a cylinder head 35 which, in part, defines a camcase 37 closed by a camcase cover 39 fixed to the cylinder head 35, and which rotatably supports a cam shaft 43.

Rotatably supported by the cylinder block 33 is a crankshaft 41 which, at its lower end, is drivingly connected to the driveshaft 25.

The cylinder head 35 also includes a flat undersurface 45, together with (see FIG. 4) an internal oil supply conduit 46 which communicates through the cylinder head 35 and through the cylinder block 33 with (see FIG. 1) a suitable sump 47 and which terminates in an oil supply port in the under surface 45 of the cylinder head 35. The cylinder head 35 also includes an internal oil delivery conduit 48 which extends in the cylinder head 35 and, as desired, in the cylinder block 33, and which terminates in an oil delivery port in the under surface 45 of the cylinder head 35.

The flat under surface 45 of the cylinder head 35 also includes, as more fully disclosed in application Ser. No. 08/253,926, which is incorporated herein by reference, a camshaft entry aperture or opening 49 (see FIG. 4) which, in the disclosed construction, is cylindrical.

Figure 2:
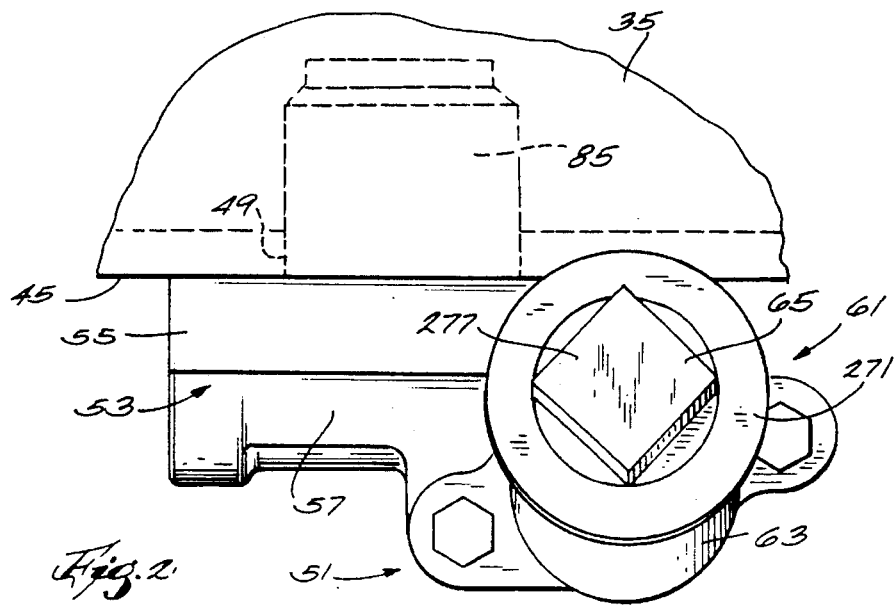
FIG. 2 is an elevational side view of a combined oil pump and filter assembly which embodies various of the features of the invention and which is included in the outboard motor shown in FIG. 1.
Figure 3:
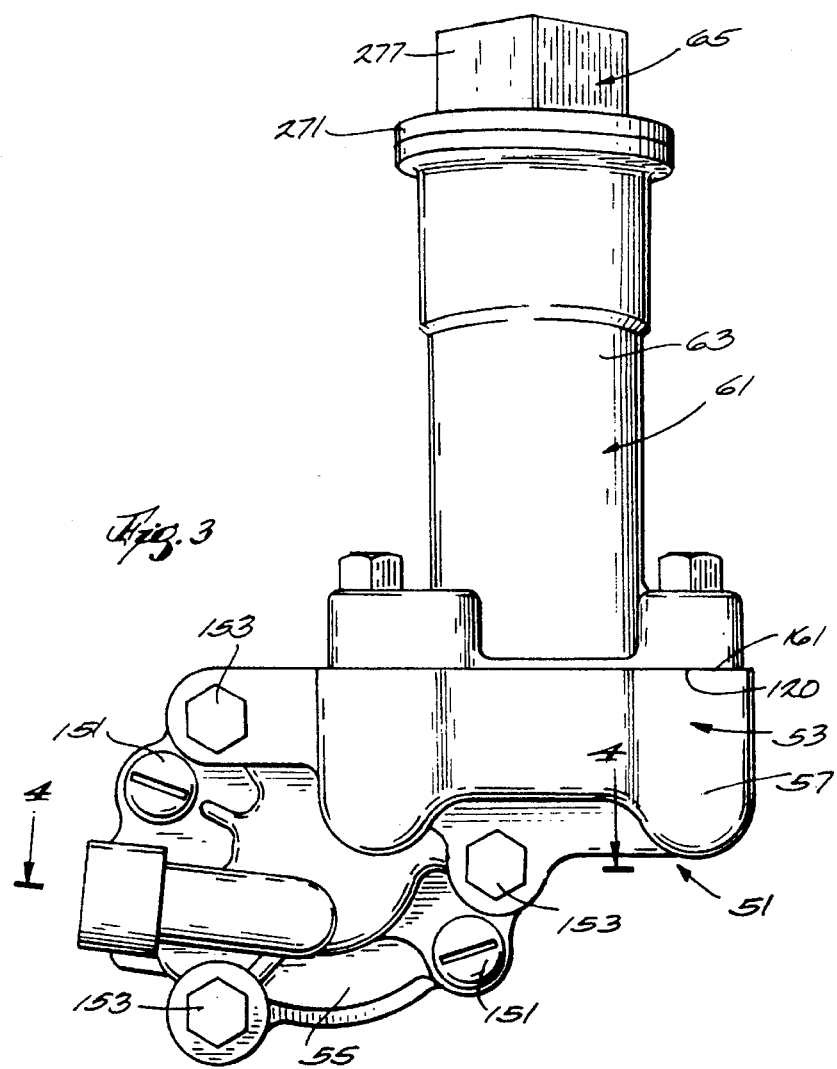
FIG. 3 is a bottom plan view of the combined oil pump and filter assembly shown in FIG. 2.

Mounted on the lower or under surface 45 of the cylinder head 35 is (see FIGS. 2, 3 and 5) a combined lubricating oil pump and filter assembly 51 which includes an oil pump sub-assembly 53 which is mounted on the undersurface 45 of the cylinder head 35 and which is formed, in part, by a pump housing or housing member 55 and an oil pump cover or cover member 57. In addition, the combined oil pump and filter assembly 51 includes a filter sub-assembly 61 which includes a filter housing or member 63 mounted on a side of the oil pump cover member 57 and (see especially FIG. 10) a replaceable filter module 65 received in the filter housing 63.

The oil pump sub-assembly 53 also includes (see FIG. 4) a rotor 71, a driver 73, and a driveshaft 75 which will be more fully described hereinafter.

The pump housing member 55 includes an upper or cylinder head mounting surface 81 engaging the under surface 45 of the cylinder head 35, and a lower or cover member mounting surface 83 which, in the disclosed construction, is parallel to the cylinder head mounting surface 81. The pump housing member 55 also includes a boss 85 which extends upwardly from the cylinder head mounting surface 81 and into the camshaft entry opening 49 in close fitting engagement thereto. A suitable O-ring (not shown) can be employed between the pump housing member 55 and the cylinder head 35 to prevent loss of oil through the camshaft entry aperture 49.

Extending upwardly from the cover member mounting surface 83 of the housing member 55 in coaxial relation with the cylindrical boss 85 is a bore 87 which includes an inner or central portion 89, together with an upper counter bore 91 and a lower counter bore 93 which, in part, forms a pump chamber 95 and which rotatably receives the rotor 71 which includes (see FIG. 6) an outer diameter generally corresponding to the diameter of the lower counter bore 93, an inner cavity 97 including a central cavity portion and an endless series of female cavities or teeth 99 extending from the central cavity portion.

Located in the inner cavity 97 is the before mentioned driver 73 which is coaxial with the rotor 71 and which includes an endless peripheral series of male teeth 105 which are one less in number than the number of female teeth 99 on the rotor 71. The axial height of the rotor 71 is substantially equal to the height of the driver 73 and the height or length of the counter bore 93. Centrally thereof, the driver 73 is provided with a bore having a flat 107, which bore receives the before mentioned driveshaft 75 which includes a corresponding flat so that rotation of the driveshaft 75 causes rotation of the driver 73 which, in turn, causes rotation of the rotor 71.

The driveshaft 75 extends upwardly and is journalled by the central portion 89 of the bore 87 and extends into the upper counter bore 91 for driving engagement with the rotatably driven camshaft 43. In this last regard, the upper end of the driveshaft 75 includes a diametrically extending slot, which receives a downwardly extending lower tang 111 extending from the camshaft 43. The cylindrical surface of the upper counter bore 91 serves as a bearing for the camshaft 43 while the shoulder 113 between the upper counter bore 91 and the central portion 89 of the bore 87 serves to engage a surface on the camshaft 43 so as to provide vertical support for the camshaft 43 as explained in application Ser. No. 08/253,926 incorporated herein by reference.

The pump housing member 55 also includes, in spaced relation to the bore 87, an internal oil supply passage 115 which extends between the cylinder head and cover member mounting surfaces 81 and 83 and which communicates, through the lower surface 45 of the cylinder head 35, with the oil supply conduit 46.

The oil pump housing or member 55 also includes, in spaced relation to the bore 87, an internal oil delivery passage 117 which extends between the cylinder head and cover member mounting surfaces 81 and 83 and which communicates, through the under surface 45 of the cylinder head 35, with the oil delivery conduit 48.

The pump chamber 95 is closed by the before mentioned cover member 57 which includes a pump housing mounting surface 119 engaging the cover member mounting surface 83 of the pump housing member 55. The cover member 57 also includes, along one side thereof, a flat filter assembly mounting surface 120.

The cover member 57 also includes, in the pump housing member mounting surface 119, an arcuate oil supply recess 121 which communicates with a portion of the circular area through which the teeth 99 and 105 of the rotor and driver travel. The arcuate oil supply recess 121 communicates with an internal generally radially extending oil supply passage 123 which, in turn, communicates with an internal axially extending oil supply passage 125 which, in turn, communicates through the pump housing member mounting surface 119 with the oil supply passage 115 in the pump housing member 55.

Figure 7:
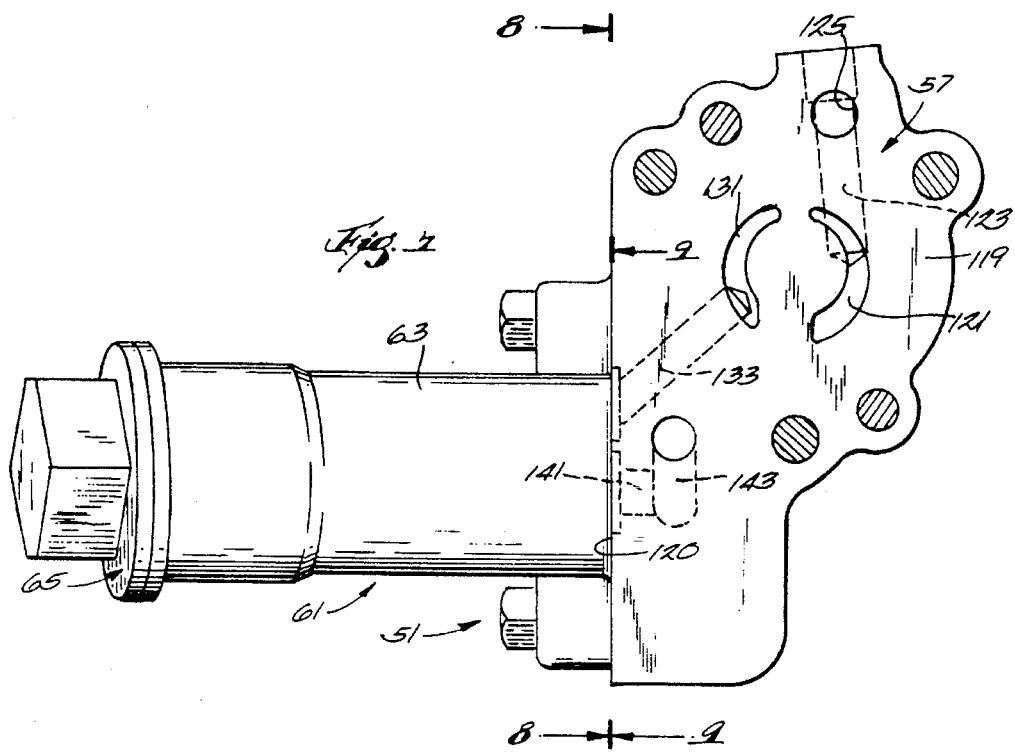
FIG. 7 is a sectional view taken along line 7—7 of FIG. 5.
Figure 8:
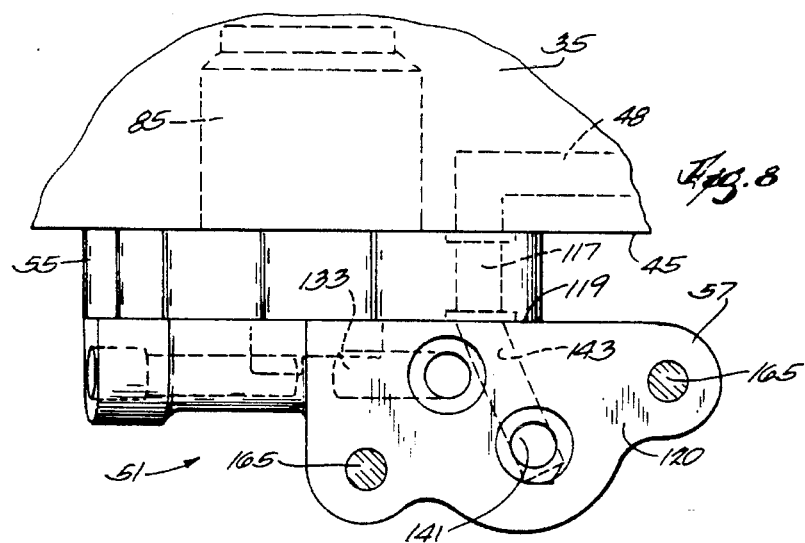
FIG. 8 is a view taken along line 8—8 of FIG. 7.

The pump housing member mounting surface 119 of the cover member 57 also includes (see FIG. 7) an arcuate oil discharge recess 131 which communicates with another portion of the circular path through which the teeth 99 and 105 of the rotor and driver travel, which discharge recess 131 is diametrically opposed to the supply recess 121. The arcuate discharge recess 131 communicates with a generally linear and radially extending internal oil discharge conduit 133 which terminates in the filter assembly mounting surface 120 of the cover member 57.

Also extending from the filter assembly mounting surface 120 of the cover member 57 is (see FIG. 7) a first internal oil delivery passage or conduit 141 which, in turn, communicates with a second internal oil delivery passage or conduit 143 which terminates in the pump housing member mounting surface 119 in communication with the oil delivery passage 117 in the pump housing member 55.

The cover member 57 is removably attached to the housing member 55 (see FIG. 3) by a pair of threaded screws 151 to define, in part, the oil pump sub-assembly 53 which, in turn, is fastened to the under surface 45 of the cylinder head 35 by a plurality of suitable bolts 153 which pass through aligned apertures in the cover member 57 and housing member 55 and which are threaded into the cylinder head 35.

Figure 9:
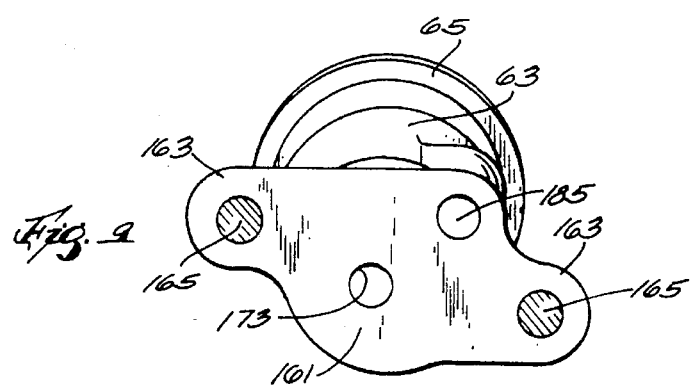
FIG. 9 is a view taken along line 9—9 of FIG. 7.

Removably fixed to the filter assembly mounting surface 120 of the cover member 57 of the pump sub-assembly 53 is the before mentioned filter housing 63 of the filter sub-assembly 53. The filter housing 63 is a generally cylindrical member having (see FIGS. 9 and 10) a cover member mounting surface 161 and a pair of lugs 163 which are apertured and receive mounting bolts 165 threaded into the filter assembly mounting surface 120 of the cover member 57.

The filter housing 63 also includes a central bore 171 which, at one end, terminates in the cover member mounting surface 161 and in communication with the delivery passage 141 of the cover member 57. The central bore 171 includes a discharge or delivery passage 173 extending from the cover member mounting surface 161, an enlarged first or inner counter bore 175 communicating with the discharge or delivery passage 173, and a second or outer and further enlarged counter bore 177 which extends axially from the first or inner counter bore 175 and which, adjacent the outer end of the filter housing 63, is open and is provided with a threaded portion 179 spaced slightly inwardly of the open end.

The filter housing 63 also includes (see FIGS. 9 and 11) an internal supply passage or conduit 185 which terminates in the cover member mounting surface 161 in registry with the discharge passage 133 in the cover member 57, which extends axially within the filter housing 63 in spaced relation to the delivery passage 173, and which communicates with the outer counter bore 177 axially outwardly of the inner screen retainer 201 still to be described.

Located in the inner and outer counter bores 175 and 177 of the filter housing 63 is the before mentioned filter module 65. The filter module 65 includes an inner screen retainer 201 having an inner end portion 203 closely received in the first or inner counter bore 175 and an adjacent larger outer end portion 205 located in the adjacent end of the second or outer counter bore 177. The inner portion 203 of the inner screen retainer 201 includes an annular groove 207 receiving an O-ring 209 to prevent fluid passage between the first counter bore 175 and the inner screen retainer 201. The outer end portion 205 includes, in the radially extending end face thereof, an inner annular screen retaining groove 211.

In addition, the inner screen retainer 201 includes an axial bore 215 communicating the delivery passage 173 in the filter housing 63, through the filter assembly mounting surface 120, with the delivery passage 141 in the cover member 57. The other or outer end of the axial bore 215 is provided with a counter bore 217 fixedly receiving an inner end portion 219 of an axially elongated body member 221 which also includes a central portion 231, an outer end portion 235, and an axial bore 223 communicating with the axial delivery bore 215 in the inner screen retainer 201. At the outer end thereof, the axial bore 223 includes first and second or inner and outer counter bores 225 and 227. A shoulder 229 is located between the axial bore 223 and the first or inner counter bore 225.

The central portion 231 of the body member 221 includes an axial series of radially extending apertures 233. Still further in addition, the outer end portion 235 of the body member 221 is enlarged as compared to the central portion 231 and includes a part of the first or inner counter bore 225 and the second or outer counter bore 227, together with a flange 237 which, in part, defines an outer annular screen retaining groove 239.

Fixed on the outer end portion 235 of the body member 221 is a generally cup shaped outer screen retainer 241 including an end wall 243 with a central aperture 245. The outer screen retainer 241 also includes an outer or first cylindrical wall or portion 247 which extends inwardly from the end wall 243 and which is fixed to the outer end portion 235 of the body member 221. Still further in addition, the outer screen retainer 241 includes an enlarged second or inner cylindrical wall or portion 249 which extends inwardly from the outer cylindrical wall portion 247 and inwardly beyond and around the flange 237 and which further defines the outer annular screen retaining groove 239. The outer surface of the larger inner cylindrical wall or portion 249 of the outer screen retainer 241 of the filter module 65 has a diameter less than the diameter of the outer or second counter bore 177 to permit oil flow there between.

The filter module 65 also includes a closure member 251 which includes an inner cylindrical portion 253 having an inner face 254, and a blind axial bore 257 extending from the inner face and including an inner counter bore 259 which is fixed on the outer cylindrical wall or portion 247 of the outer screen retainer 241 and a blind outer end portion 261 which communicates, through the aperture 245 in the end wall 243 of the outer screen retainer 241, with the outer counter bore 227 in the outer end portion 235 of the body member 221.

The inner end of the inner cylindrical portion 253 of the closure member 251 includes a threaded portion 255 for receipt in the threaded portion 179 of the outer counter bore 177 of the filter housing 63 to effect assembly of the filter module 65 in the filter housing 63. The outermost part of the outer surface of the inner cylindrical portion 253 is left unthreaded.

Outwardly of the inner cylindrical portion 253, the closure member 251 includes a flange portion 271 having an inner surface 213 which extends radially outwardly from the unthreaded portion of the inner cylindrical portion 253 so as to engage the outer face of the filter housing 63 when the filter module 65 is fully threaded into the filter housing 63 and so as to provide, the outermost portion of the outer surface of the inner cylindrical portion 253, with a seat for an O-ring 275 which engages the outer portion of the outer counter bore 177 of the filter housing 63 to prevent loss of oil between the closure member 251 and the filter housing 63. Outwardly of the flange portion 271, the closure member 251 includes a non-circular head 277 to facilitate threaded assembly and disassembly of the filter module 65 into the filter housing 63.

The filter module 65 also includes a cylindrical screen or filter 281 which encircles the central portion 231 of the body member 221 and which, at its ends, is received in the annual grooves 211 and 239 defined by the inner and outer screen retainers 201 and 241. The screen 281 can be of suitable conventional construction and includes a large plurality of relatively small openings affording oil flow through the screen 281 and through the apertures 233 in the central portion 231 of the body member 221 and into the central or axial bore 223 thereof for flow out the delivery or discharge passage 173. The screen 281 defines, with the inner wall of the outer counter bore 177 of the housing member 63, an annular space 285.

In operation of the filter sub-assembly 61, oil under pressure is delivered from the cover member discharge passage 133 to the supply passage 185 in the filter housing 63 and then into the annular space 285 in the outer counter bore 177 radially outwardly of the screen or filter 281. The pressurized oil then flows through the screen or filter 281, through the apertures 233 in the central portion 231 of the body member 221 and into the axial bore 223 in the body member 221, through the bore 215 in the inner screen retainer 201, and through the delivery passage 173 in the filter housing 63 and into the delivery passage 141 in the cover member 57.

In the event the screen or filter 281 becomes so clogged as to prevent normal oil flow through the filter sub-assembly 61, means are provided for bypassing the screen 281 until the clogged filter module 65 can be removed and replaced with a clean filter module 65. While other arrangements can be provided, in the disclosed construction, such means comprises a bypass passage 291 including a pressure relief valve 293, which bypass passage remains closed until the pressure build-up in the annular space 285 by reason of clogging of the screen 281 serves to open the relief valve 293 and the bypass passage 291.

The bypass passage 291 includes a pair of slots 295 which are diametrically opposed and which are located in the threaded portion 255 of the closure member 251 and which axially extend outwardly from the inner end thereof. The slots 295 communicate with a cross bore 297 which is provided in the closure member 251 and which communicates with the blind outer end portion 261 of the axial bore 257 in the closure member 251. Thus, pressurized oil can travel from the annular space 285 through the slots 295, through the cross bore 297 and through the blind axial bore 257 in the closure member 251, through the opening 245 in the end wall 243 of the outer screen retainer 241, through the counter bores 225 and 227, and into the bore 223 in the body member 221, through the inner screen retainer 201, and through the discharge or delivery passage 173 of the filter housing 63 and to the delivery passage 141 of the cover member 57.

Such passage is prevented under normal operations by a valve member 301 which is located in the outer counter bore 227 and which includes an axially extending stem 303 and an enlarged head 305 which is engagable with the inner surface of the end wall 243 of the outer screen retainer 241 to prevent oil flow through the bypass passage 291. The valve member 301 is biased to a closed position by a spring 307 which surrounds the stem 303 and which, at its ends, bears against the inner surface of the valve member head 305 and against the shoulder 229 between the bore 223 and the inner counter bore 225 in the body member 221. The valve member 301 is dimensioned so as to permit passage there around and through the outer counter bore 227 when the valve member 301 is in its open position. Thus, the bypass passage 291 is maintained closed in the absence in the annular space 285 of an elevated pressure which occurs incident to clogging of the screen or filter 281.

In operation, rotation of the driver 73 by the camshaft 43 pumps oil from the sump 47 through the internal passage 46 in the cylinder block 33 and cylinder head 35, through the internal oil supply passage 115 in the pump housing member 55, and through the internal oil supply passages 123 and 125 in the cover member 57 to the oil supply recess 121. Rotation of the driver 73 also pumps oil from the discharge recess 131 and through the internal oil discharge passages 133 in the cover member 57, and into the filter sub-assembly 61. Flow in the filter sub-assembly 61 is as explained immediately above. From the discharge passage 173 of the filter sub-assembly 61, the oil flows through the delivery passages 141 and 143 in the cover member 57 and through the delivery passage 117 in the pump housing member 55, and into the delivery passage 48 in the cylinder head 35 and engine block 33, and to appropriate places where lubricating oil is desired.

Thus, the disclosed construction provides a combined lubricating pump and filter assembly 51 without any external piping, which can be readily attached to and removed from the cylinder head 35, which is of economical construction, which can be easily assembled and disassembled for cleaning or otherwise, and which includes a replaceable filter module 65 which can be easily replaced and which also provides the valve controlled bypass passage 291 to accommodate continued oil flow to the engine in the event the filter or screen 281 becomes clogged and until a clean filter module 65 can be substituted for the clogged filter module 65.

Various of the features of the invention are set forth in the following claims.

We claim:

1. An oil pump assembly comprising a housing member including a first mounting surface adapted to engage a first other mounting surface, a cover member mounting surface spaced from said first mounting surface, a bore extending from said cover member mounting surface and including, adjacent said cover member mounting surface, a counter bore, an oil supply passage extending between said first mounting surface and said cover member mounting surface for communication with an oil supply port in the first other mounting surface, and an oil delivery passage extending between said first mounting surface and said cover member mounting surface for communication with an oil delivery port in the first other mounting surface, a cover member including a housing member mounting surface engaging said cover member mounting surface of said housing member, a second other mounting surface, an oil supply recess located in said housing member mounting surface and communicating with said counter bore in said housing member, an internal oil supply conduit communicating between said oil supply recess and said housing member mounting surface and communicating with said oil supply passage in said housing member, an oil discharge recess located in said housing member mounting surface and communicating with said counter bore in said housing member, an internal oil discharge passage communicating between said oil discharge recess and said second other mounting surface, and an internal oil delivery passage extending between said housing member mounting surface and said second other mounting surface and communicating with said oil delivery passage in said housing member, and fasteners releasably connecting said cover member to said housing member to form a pump assembly.

2. An oil pump assembly in accordance with claim 1 wherein said second other mounting surface comprises a filter assembly mounting surface, and further including a filter assembly including a filter housing having a cover member mounting surface engaging said filter assembly mounting surface, a central bore extending from said cover member mounting surface and communicating with said oil delivery passage in said cover member, and an internal oil supply passage communicating with said central bore in spaced relation from said cover member mounting surface and communicating with said discharge passage in said cover member, and a filter module located in said bore in said filter housing and including a filter element intermediate said cover member mounting surface and said filter housing oil supply passage.

3. An oil pump in accordance with claim 1 and further including a rotor located in said counter bore and having a central aperture with an inner periphery including an endless series of teeth, a driver located in said central aperture of said rotor and including an outer periphery with an endless series of teeth which intermesh with said teeth of said inner periphery of said rotor and which are one less in number than said teeth of said rotor, and a driveshaft extending in said bore, adapted to be rotated by a camshaft, and drivingly connected to said driver for rotation thereof in common with rotation of said driveshaft.

4. An oil pump and filter assembly comprising a housing member including a first mounting surface adapted to engage a first other mounting surface, a cover member mounting surface spaced from said first mounting surface, a bore extending from said cover member mounting surface and including, adjacent said cover member mounting surface, a counter bore, an oil supply passage extending between said first mounting surface and said cover member mounting surface and being adapted to communicate with an oil supply port in the first other mounting surface, and an oil delivery passage extending between said first mounting surface and said cover member mounting surface and adapted to communicate with an oil delivery port in the first other mounting surface, a rotor located in said counter bore and having a central aperture with an inner periphery including an endless series of teeth, a driver located in said central aperture of said rotor and including an outer periphery with an endless series of teeth which intermesh with said teeth of said inner periphery of said rotor and which are one less in number than said teeth of said rotor, a driveshaft extending in said bore, adapted to be rotated by a camshaft, and drivingly connected to said driver for rotation thereof in common with rotation of said driveshaft, a cover member including a housing member mounting surface engaging said cover member mounting surface of said housing member, a filter assembly mounting surface, an oil supply recess located in said housing member mounting surface and communicating with said counter bore in said housing member, an internal oil supply conduit communicating between said oil supply recess and said housing member mounting surface and communicating with said oil supply passage in said housing member, an oil discharge recess located in said housing member mounting surface and communicating with said counter bore in said housing member, an internal oil discharge passage communicating between said oil discharge recess and said filter assembly mounting surface, and an internal oil delivery passage extending between said housing member mounting surface and said filter assembly mounting surface and communicating with said oil delivery passage in said housing member, fasteners releasably connecting said cover member to said housing member to form a pump assembly, a filter assembly including a filter housing having a cover member mounting surface engaging said filter assembly mounting surface, a central bore extending from said cover member mounting surface and communicating with said oil delivery passage in said cover member, and an internal oil supply passage communicating with said central bore in spaced relation from said cover member mounting surface and with said discharge passage in said cover member, and a filter module located in said bore in said filter housing and including a filter element intermediate said cover member mounting surface and said filter housing oil supply passage, and fasteners releasably connecting said filter housing to said cover member.

5. An internal combustion engine comprising a cylinder head having a mounting surface including therein a camshaft opening, an oil delivery port, and an oil supply port, and an oil pump assembly comprising a housing member including a cylinder head mounting surface engaging said mounting surface on said cylinder head, a cover member mounting surface spaced from said cylinder head mounting surface, a bore extending from said cover member mounting surface in alignment with said camshaft opening and including, adjacent said cover member mounting surface, a counter bore, an oil supply passage extending between said cylinder head mounting surface and said cover member mounting surface and communicating with said oil supply port in said mounting surface of said cylinder head, and an oil delivery passage extending between said cylinder head mounting surface and said cover member mounting surface and communicating with said oil delivery port in said mounting surface of said cylinder head, a cover member including a housing member mounting surface engaging said cover member mounting surface of said housing member, an other mounting surface, an oil supply recess located in said housing member mounting surface and communicating with said counter bore in said housing member, an internal oil supply conduit communicating between said oil supply recess and said housing member mounting surface and communicating with said oil supply passage in said housing member, an oil discharge recess located in said housing member mounting surface and communicating with said counter bore in said housing member, an internal oil discharge passage communicating between said oil discharge recess and said other mounting surface, and an internal oil delivery passage extending between said housing member mounting surface and said other mounting surface and communicating with said oil delivery passage in said housing member, fasteners releasably connecting said cover member to said housing member to form a pump assembly, and fasteners releasably connecting said pump assembly to said cylinder head.

6. An internal combustion engine in accordance with claim 5 and further including a rotor located in said counter bore and having a central aperture with an inner periphery including an endless series of teeth, a driver located in said central aperture of said rotor and including an outer periphery with an endless series of teeth which intermesh with said teeth of said inner periphery of said rotor and which are one less in number than said teeth of said rotor, and a driveshaft extending in said bore, adapted to be rotated by a camshaft in said cylinder head, and drivingly connected to said driver for rotation thereof in common with rotation of said driveshaft.

7. An internal combustion engine in accordance with claim 5 and further including a filter housing having a cover member mounting surface engaging said filter assembly mounting surface, a central bore extending from said cover member mounting surface and communicating with said oil delivery passage in said cover member, and an internal oil supply passage communicating with said central bore in spaced relation from said cover member mounting surface and with said discharge passage in said cover member, a filter module including a filter element located in said bore in said filter housing intermediate said cover member mounting surface and said oil supply passage in said filter housing, and fasteners releasably connecting said filter housing to said cover member.

8. An internal combustion engine comprising a cylinder head having a mounting surface including therein a camshaft opening, an oil supply port, and an oil delivery port, and an oil pump and filter assembly comprising a housing member including a cylinder head mounting surface engaged with said mounting surface on said cylinder head, a cover member mounting surface spaced from said cylinder head mounting surface, a bore extending from said cover member mounting surface in alignment with said camshaft opening and including, adjacent said cover member mounting surface, a counter bore, an oil supply passage extending between said cylinder head mounting surface and said cover member mounting surface and communicating with said oil supply port in said mounting surface of said cylinder head, and an oil delivery passage extending between said cylinder head mounting surface and said cover member mounting surface and communicating with said oil delivery port in said mounting surface of said cylinder head, a rotor located in said counter bore and having a central aperture with an inner periphery including an endless series of teeth, a driver located in said central aperture of said rotor and including an outer periphery with an endless series of teeth which intermesh with said teeth of said inner periphery of said rotor and which are one less in number than said teeth of said rotor, a driveshaft extending in said bore, adapted to be rotated by a camshaft in said cylinder head, and drivingly connected to said driver for rotation thereof in common with rotation of said driveshaft, a cover member including a housing member mounting surface engaging said cover member mounting surface of said housing.member, a filter assembly mounting surface, an oil supply recess located in said housing member mounting surface and communicating with said counter bore in said housing member, an internal oil supply conduit communicating between said oil supply recess and said housing member mounting surface and communicating with said oil supply passage in said housing member, an oil discharge recess located in said housing member mounting surface and communicating with said counter bore in said housing member, an internal oil discharge passage communicating between said oil discharge recess and said filter assembly mounting surface, and an internal oil delivery passage extending between said housing member mounting surface and said filter assembly mounting surface and communicating with said oil delivery passage in said housing member, fasteners releasably connecting said cover member to said housing member to form a pump assembly, fasteners releasably connecting said pump assembly to said cylinder head, a filter assembly including a filter housing having a cover member mounting surface engaging said filter assembly mounting surface, a central bore extending from said cover member mounting surface and communicating with said oil delivery passage in said cover member, and an internal oil supply passage communicating with said central bore in spaced relation from said cover member mounting surface and with said discharge passage in said cover member, and a filter module including a filter element located in said bore in said filter housing intermediate said cover member mounting surface and said oil supply passage in said filter housing, and fasteners releasably connecting said filter housing to said cover member.

9. A filter assembly including a filter housing having a flat mounting surface adapted to engage another member, a bore extending from said flat mounting surface and adapted to communicate with an oil delivery conduit, and a delivery passage extending from said flat mounting surface in spaced relation to said bore, communicating with said bore in spaced relation to said flat mounting surface, and adapted to communicate with a source of oil, and a filter module releaseably assembled in said bore in said filter housing and including a filter element intermediate said flat mounting surface and said delivery passage.

10. A filter assembly in accordance with claim 9 wherein said filter module also includes a by-pass passage extending between said oil delivery passage and said central bore in by-passing relation to said filter element and including a normally closed valve which opens in response to clogging of said filter element.

11. A filter assembly in accordance claim 10 wherein said central bore in said filter housing includes an inner end portion adjacent said fiat mounting surface, wherein said filter module also includes a closure member closing said central bore in said filter housing and including an inner bore communicating with said end portion of said central bore in said filter housing, wherein said by-pass passage includes an axially extending slot in said closure member and said filter housing, and a cross bore in said closure member communicating with said slot and with said closure member inner bore, and wherein said normally closed valve is located between said inner bore in said closure member and said end portion of said central bore in said filter housing.

12. A filter assembly in accordance with claim 9 wherein said bore includes an end portion extending from said mounting surface, an inner counter bore extending from said end portion, and an outer counter bore extending from said inner counter bore and including an outer threaded portion, and wherein said delivery passage is located internally of said filter housing and communicates with said outer counter bore in spaced relation from said inner counter bore.

13. A filter assembly in accordance with claim 12 wherein said outer counter bore includes an inner end, and wherein said filter module includes an inner screen retainer located in said inner counter bore and said inner end of said outer counter bore, a central bore communicating with said end portion of said bore in said housing and including an end portion, a counter bore extending from said end portion of said central bore, and an annular filter screen retaining groove, a body member including an inner end portion received in said counter bore in said screen retaining member, a central portion with a plurality of apertures, an outer end portion, and an axial bore communicating with said central bore in said inner screen retainer and with said apertures in said central portion, and an outer screen retainer including an outer end wall having therein a central aperture, an outer cylindrical portion extending inwardly from said end wall and fixed on said outer end portion of said body member, and an inner cylindrical portion extending inwardly from said outer cylindrical portion and defining, with said inner screen retainer, an outer screen retaining groove located in facing relation to said inner screen retaining groove.

14. A filter assembly in accordance with claim 13 and further including a closure member including an inner cylindrical portion fixed on said outer cylindrical portion of said outer screen retainer and including a bore communicating with said aperture in said end wall of said outer screen retainer, and an outer cylindrical surface with a threaded portion threadedly engaged with said outer threaded portion of said outer counter bore of said filter housing.

15. An oil filter assembly comprising a filter housing having a mounting surface, a central bore including an end portion extending from said mounting surface, an inner counter bore extending from said end portion, and an outer counter bore extending from said inner counter bore and including an outer threaded portion, and an internal oil supply passage communicating with said mounting surface in spaced relation to said end portion of said central bore and with said outer counter bore in spaced relation from said inner counter bore, and a filter module located in said central bore and including an inner screen retainer located in said inner counter bore and said inner end of said outer counter bore and including a central bore including an inner portion communicating with said end portion of said central bore in said filter housing, an outer counter bore extending from said inner portion, and an annular filter screen retaining groove, a body member including an inner end portion fixed in said counter bore in said inner screen retainer, a central portion with a plurality of apertures communicating with said outer counter bore in said filter housing, an outer end portion, and an axial bore communicating with said inner portion of said central bore in said inner screen retainer and with said apertures in said central portion, an outer screen retainer including an outer end wall having therein a central aperture communicating with said axial bore in said body member, an outer cylindrical portion extending inwardly from said end wall and fixed on said outer end portion of said body member, and an inner cylindrical portion extending inwardly from said outer cylindrical portion and defining, with said body member, an outer screen retaining groove located in facing relation to said inner screen retaining groove, a screen having ends retained in said inner and outer screen retaining grooves, and a closure member including an inner cylindrical portion including a bore communicating with said central aperture in said end wall of said outer screen retainer and including a counter bore fixed on said outer cylindrical portion of said outer screen retainer, and an outer cylindrical surface with a threaded portion threadedly engaged with said outer threaded portion of said outer counter bore of said filter housing.

16. A filter assembly in accordance with claim 15 wherein said filter module also includes a by-pass passage extending between outer counter bore in said filter housing and said axial bore in said body member in by-passing relation to said screen and including a normally closed valve which opens in response to clogging of said screen.

17. A filter assembly in accordance with claim 16 wherein said by-pass passage includes an axially extending slot in said threaded portions of said closure member and said filter housing, and a cross bore located in said inner cylindrical portion of said closure member and communicating with said axially extending slot and with said central aperature in said end wall of said outer screen retainer, and wherein said normally closed valve is located between said bore in said closure member and said axial bore in said body member.

18. A filter assembly in accordance with claim 17 wherein said axial bore in said body member includes an outer counter bore, and wherein said valve includes a valve member located in said outer counter bore in said body member and being engagable with said end wall of said outer screen retainer to releasably close said central aperture, and a spring located in said outer counter bore in said axial bore in said body member and biasing said valve member to said closed position.

19. A filter assembly including a filter housing having a flat mounting surface adapted to engage another member, a central bore extending from said flat mounting surface and adapted to communicate with an oil delivery conduit, and an internal oil supply passage extending from said flat mounting surface in spaced relation to said central bore, communicating with said bore in spaced relation to said flat mounting surface, and adapted to communicate with an oil supply conduit, and a filter module releasably assembled in said bore in said filter housing and including a filter element located intermediate said flat mounting surface and said internal oil supply passage.

* * * * *